United States Patent [19]
Irish et al.

[11] Patent Number: 5,445,783
[45] Date of Patent: Aug. 29, 1995

[54] BLOW MOLDING METHOD

[75] Inventors: Truly R. Irish, Oak Park; Daniel J. Kmiecik, Dearborn Heights, both of Mich.

[73] Assignee: Ford Motor Company, Dearborn, Mich.

[21] Appl. No.: 86,068

[22] Filed: Jul. 6, 1993

[51] Int. Cl.6 .............................................. B29C 49/20
[52] U.S. Cl. ..................................... 264/515; 264/516
[58] Field of Search ................ 264/515, 516; 425/503, 425/504, 522

[56] References Cited

U.S. PATENT DOCUMENTS

| | | | |
|---|---|---|---|
| 3,655,849 | 4/1972 | Hayashi | 264/516 |
| 3,705,931 | 12/1972 | Confer et al. | 264/516 |
| 4,427,360 | 1/1984 | Albrecht et al. | 425/541 |
| 4,499,044 | 2/1985 | Hone et al. | 264/521 |
| 4,521,177 | 6/1985 | Blank et al. | 425/533 |
| 4,539,172 | 9/1985 | Winchell et al. | 264/515 |
| 4,566,871 | 1/1986 | Hone et al. | 425/525 |
| 4,589,563 | 5/1986 | Born | 264/516 |
| 4,590,028 | 5/1986 | Rosenkranz et al. | 264/154 |
| 4,719,072 | 4/1986 | Kojima et al. | |
| 4,827,603 | 5/1989 | Akhter | 264/515 |
| 4,874,649 | 10/1989 | Daubenbuchel et al. | 428/36.5 |
| 4,894,198 | 1/1990 | Albrecht et al. | 264/521 |
| 4,933,135 | 6/1990 | Horwege et al. | 264/521 |
| 4,943,228 | 7/1990 | Reymann et al. | 425/526 |
| 4,943,229 | 7/1990 | Reymann et al. | 425/535 |
| 4,952,347 | 8/1990 | Kasugai . | |
| 5,141,698 | 8/1992 | Daubenbuchel et al. | 264/515 |
| 5,143,681 | 9/1992 | Daubenbuchel et al. | 264/515 |
| 5,219,513 | 6/1993 | Addeo et al. | 264/510 |

FOREIGN PATENT DOCUMENTS

| | | | |
|---|---|---|---|
| 0103832 | 9/1983 | European Pat. Off. . | |
| 1318384 | 5/1973 | Germany . | |
| 55-161623 | 12/1980 | Japan | 264/516 |
| 56-51333 | 5/1981 | Japan | 264/516 |
| 61-148019 | 7/1986 | Japan | 264/516 |
| 4-091923 | 3/1992 | Japan | 264/516 |
| 2101520A | 6/1982 | United Kingdom . | |

*Primary Examiner*—Catherine Timm
*Attorney, Agent, or Firm*—Damian Porcari; R. L. May

[57] ABSTRACT

A method of securing a member to the interior of a blow-molded article including the steps of extruding a pliable tubular parison having interior and exterior surfaces; positioning the member within the parison; and contacting the member with the interior parison surface. A movable blow-pin urges the member against the parison wall. The member has a recessed attaching surface that interlocks with the parison wall to form a secure attachment.

1 Claim, 5 Drawing Sheets ly apparatus. The article wall remains integral and impermeable.

BLOW MOLDING METHOD

BACKGROUND OF THE INVENTION

1. Field of the Invention

The present invention relates to a method of securing a member to the interior of a blow molded article. More specifically, the invention relates to a mechanical interlocking attachment between a fuel reservoir cup and the interior surface of a blow-molded plastic fuel tank.

2. Description of the Related Art

Various methods exist for attaching members to the interior of plastic fuel tanks. Common fastening methods include bonding and welding. Mechanical fasteners are also used to attaching items to the exterior of molded fuel tank. One example is illustrated in U.S. Pat. No. 5,067,575, assigned to Ford Motor Company, which teaches integrally molding a socket into a blow-molded wall. A peg fastening means attaches within the socket to provide an attachment point for a member. This invention is primarily directed for securing items to the exterior surface of a blow-molded container. When attaching articles to the interior of the container, it becomes difficult to form an outwardly extending socket.

It is also known to temporarily adhere or tack a member to the interior of a fuel tank by positioning it within a tubular plastic parison. The member is generally made from a similar or compatible material as the parison and is urged against the hot parison. The heat from the parison forms a temporary attachment with the member. After the article is molded into its final shape and removed from the mold, the member is securely attach to the tank wall through heat staking. Heat staking fuses the member to the fuel tank wall. This process requires subsequent manipulation of the article after the molding step. Heat staking also requires access to the member from the exterior of the molded tank. The member must be made from a similar or compatible material as the fuel tank.

The present invention is directed to a method of simultaneously molding a fuel tank and securing a member to the interior surface of the molded article. The simultaneous molding and securing method disclosed eliminates the need for subsequent processing steps to secure the member to the tank wall.

SUMMARY OF THE INVENTION

The present invention teaches a method of securing a member to the interior of a blow-molded article comprising the steps of extruding a pliable tubular parison, the parison having interior and exterior surfaces; positioning the member within the parison; and contacting the member with the interior parison surface. A recessed attaching surface on said member interlocks with the parison wall and secures the member to the tank.

One method of contacting the member with the parison is to use a movable blow pin which urges the member against the parison wall. An alternative method is to use a stationary blow pin positioned to contact the parison wall as the mold dies are moved to a closed position.

The present invention permits a secure and permanent attachment of a member to the interior surface of an article during the blow molding process. No subsequent processing steps are necessary to permanently secure the member after removal from the blow mold-

BRIEF DESCRIPTION OF THE DRAWINGS

Illustrated in FIG. 1 is a cross-sectional view of a blow molding apparatus using a movable blow pin and shows the apparatus in an open position.

Illustrated in FIG. 2 is the apparatus shown in FIG. 1 in the closed position.

Figure 3:
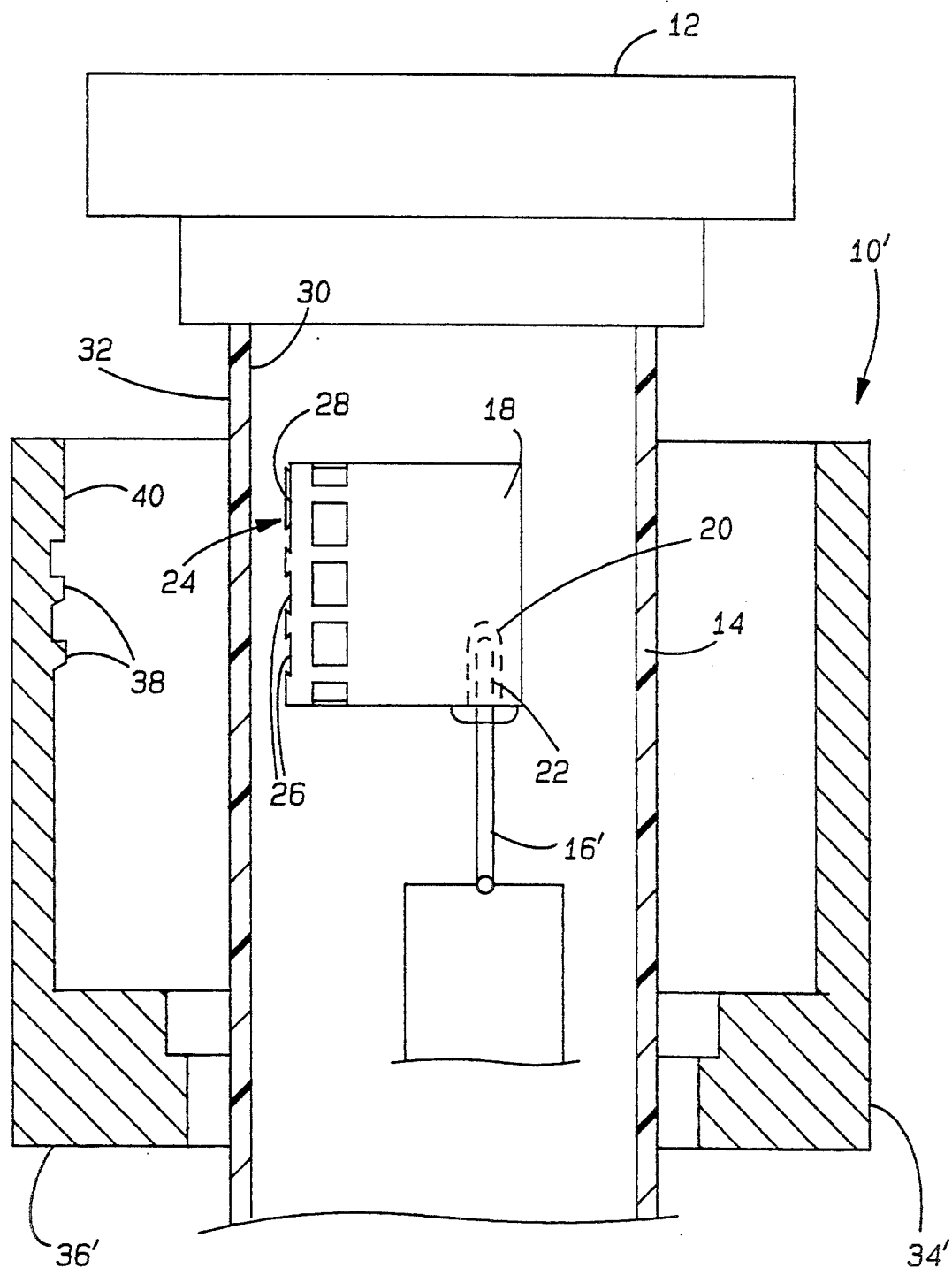

Illustrated in FIG. 3 is an alternative embodiment of the invention using a stationary blow pin and shows the apparatus in the open position.

Figure 4:
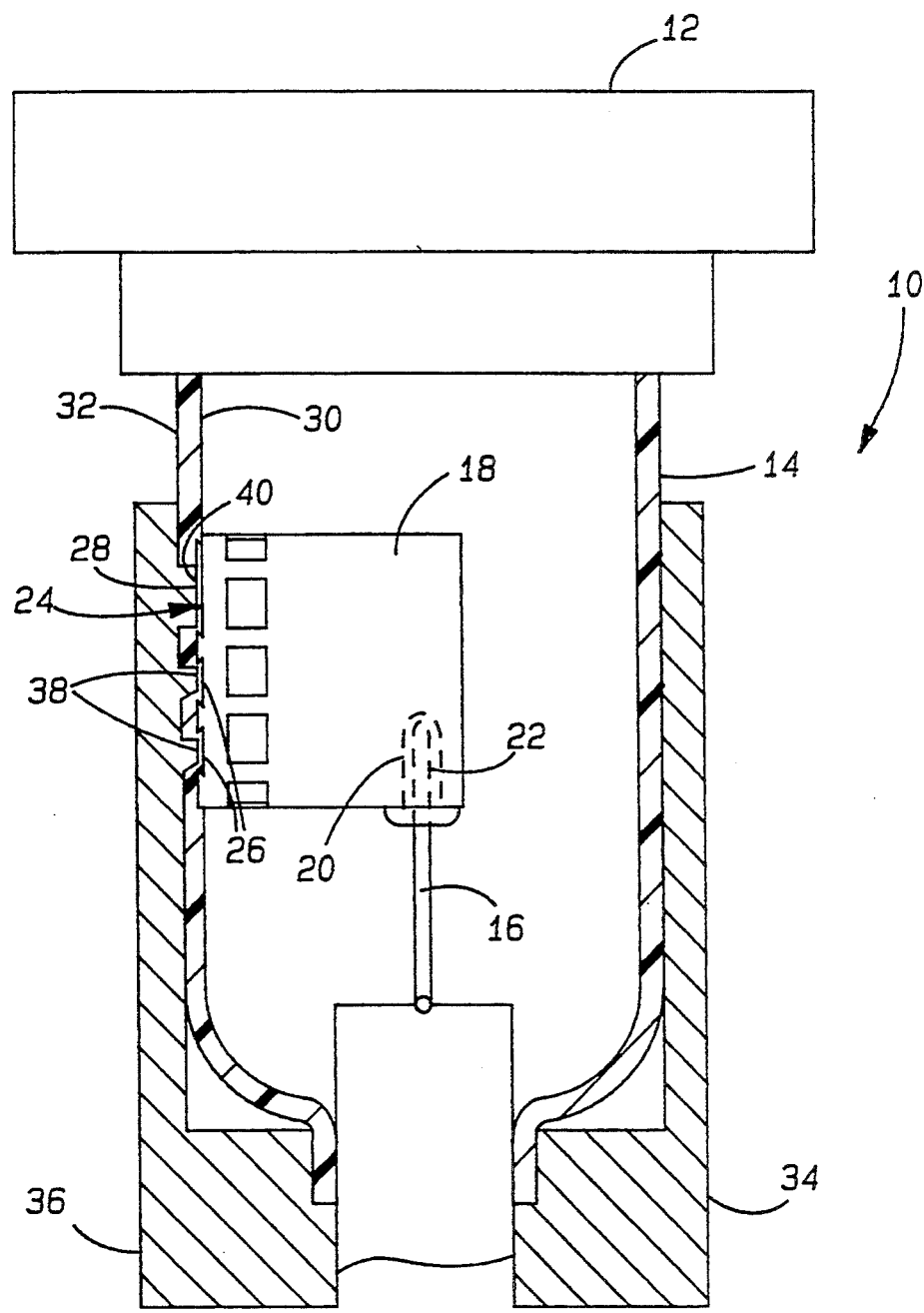

Illustrated in FIG. 4 is the apparatus shown in FIG. 3 in the closed position.

Figure 5:
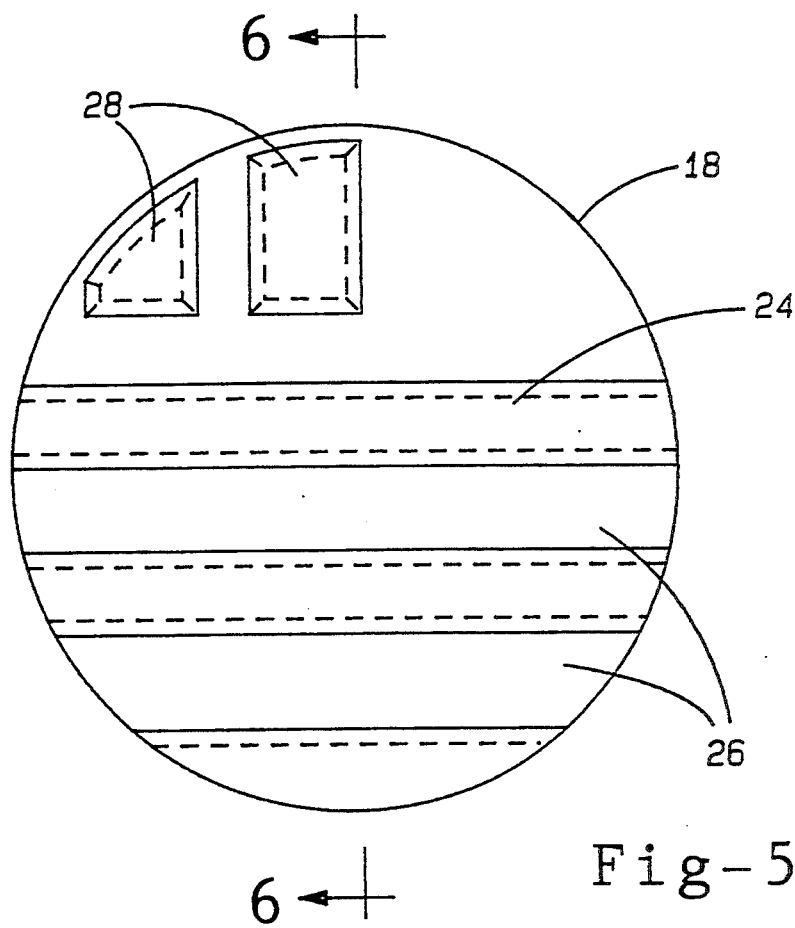

Illustrated in FIG. 5 is the bottom view of the member's recessed attaching surface.

Figure 6:
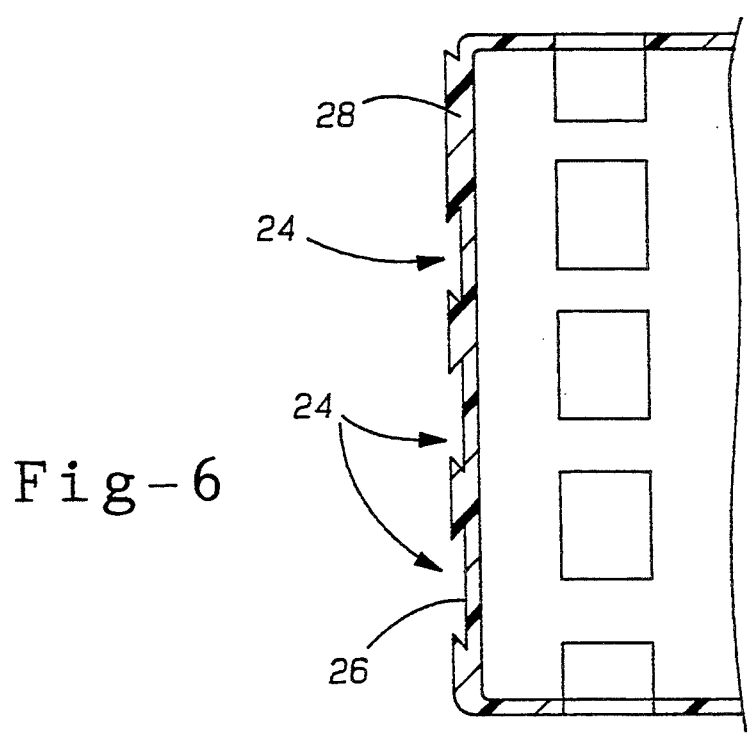

Illustrated in FIG. 6 is a cross-sectional view taken along the line 6—6 in FIG. 5.

DETAILED DESCRIPTION OF THE PREFERRED EMBODIMENTS

Figure 1:
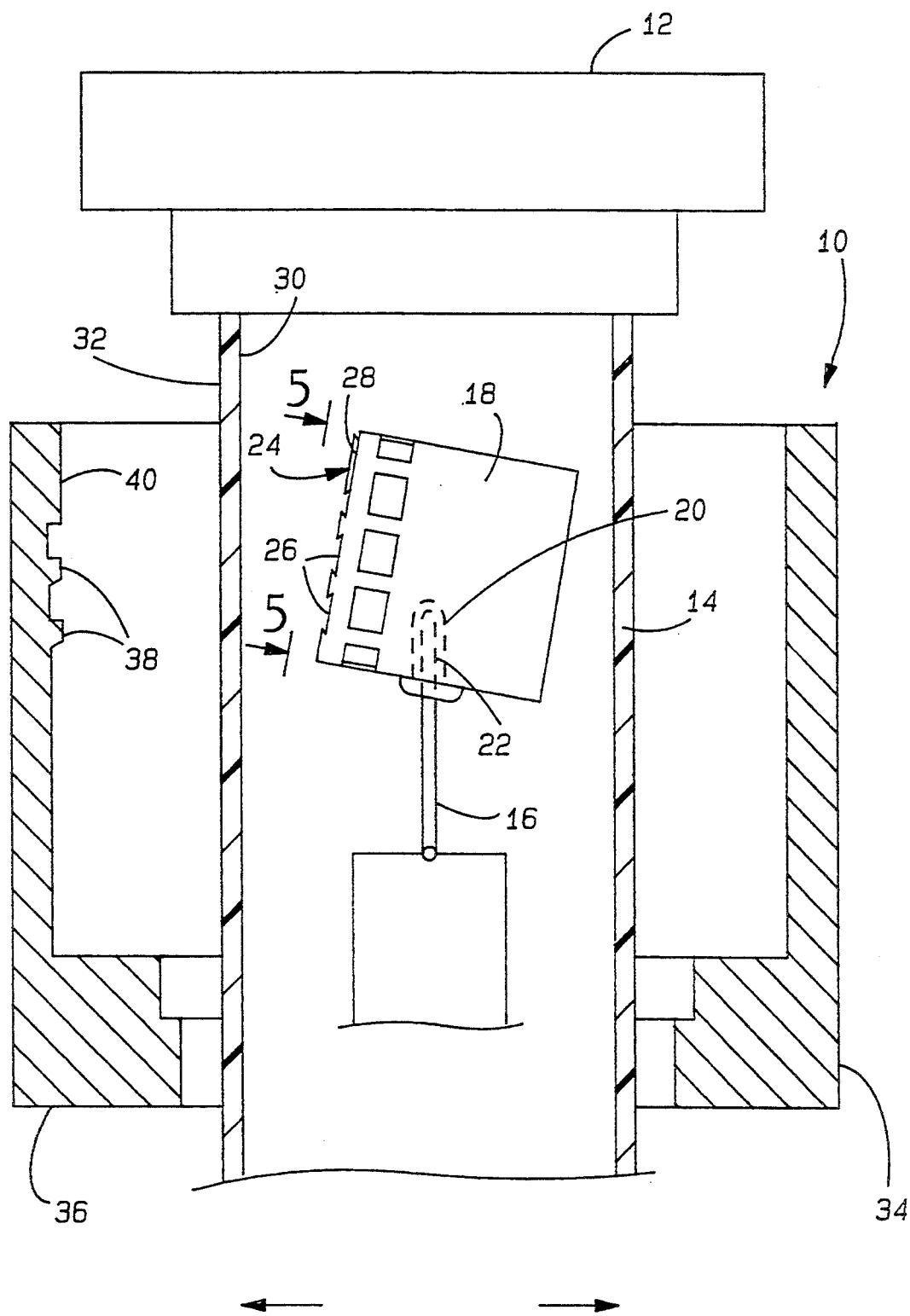

The present invention relates to a method of simultaneously blow-molding an article and securing a member to the interior surface of the molded article. FIG. 1 illustrates blow-molding apparatus 10 used in the present invention. Extruder 12 extrudes an elongated tubular pliable parison 14. Parison 14 surrounds movable blow-pin 16. Blow pin 16 is shown in the vertical (unmoved) position. Attached atop blow-pin 16 is member 18. Member 18 contains socket 20 receiving blow pin tip 22. Member 18 is placed atop blow-pin 16 before parison 14 is extruded. Member 18 may be any component that requires attachment to the interior surface of a container. When used for automotive fuel tank applications, member 18 may be fuel tank reservoir or fuel delivery module retaining cup. Member 18 contains a recessed attaching surface 24.

Illustrated in FIGS. 5 and 6 are detailed views of member 18 and attaching surface 24. Dove-tail grooves 26, 28 are formed on surface 24. Grooves 26 are formed in the horizontal direction and grooves 28 are formed in the vertical direction. Positioning grooves 28 and 26 at angles with respect to one another prevents rotation of member 18 and more securely retains it to the parison.

Parison 14 has an interior surface 30 and exterior surface 32. Interior surface 30 engages and is secured to surface 24. Apparatus 10 comprises movable molds 34, 36. Located on the interior surface of mold 36 are projections 38, 40 extending from mold 36 toward parison 14. Projections 38, 40 are aligned to mate with grooves 26, 28.

Figure 2:
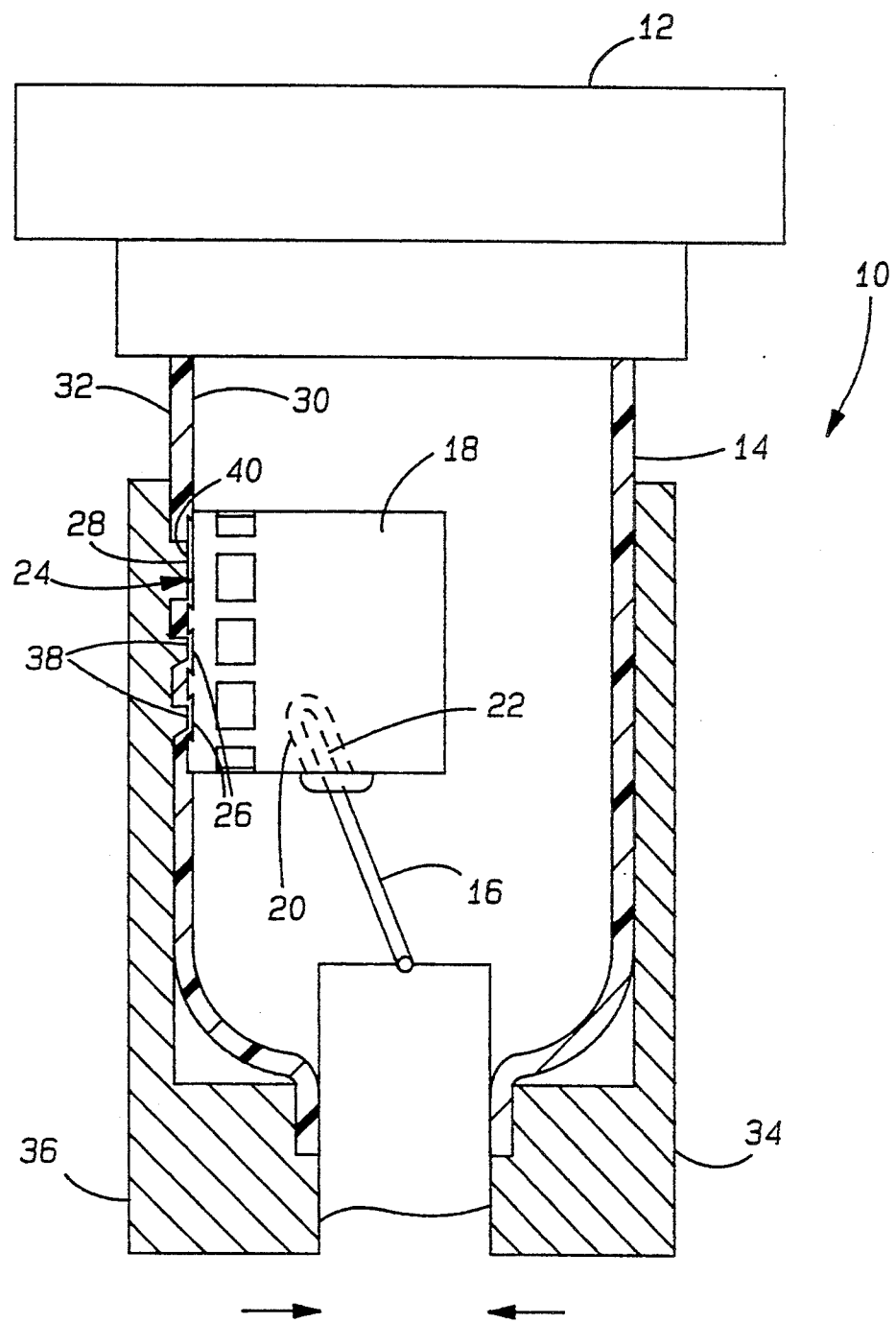

Illustrated in FIG. 2 is apparatus 10 in the closed position. Molds 36, 34 seal the top and bottom of parison 14. Blow pin 16 is pivoted to an angled position (moved) to cause member 18 to contact parison 14. Grooves 26, 28 of surface 24 engage projections 38, 40. Interior parison surface 30 is forced within surface 24 and placed in intimate contact with grooves 26, 28. Parison 14 is inflated and takes the shape of molds 34, 36. Final inflation further urges member 18 against surface 30. Parison 14 is permitted to cool into the final molded article. Member 18 is permanently and securely attached to interior surface 30.

Because surface 24 is mechanically attached by an interlocking dove-tail fit, member 18 and parison 14 may be made of dissimilar and incompatible materials. For example, parison 14 may be high density polyethylene and member 18 may be made from a higher melting dissimilar material such as nylon. It is an advantage of the present invention that member 18 may be made from a material which will not bond with or fuse to parison 14 illustrated in FIGS. 3 and 4 is an alternative embodiment of apparatus 10'. Blow-pin 16' receives member 18 as previously described. Blow-pin 16' is stationary and remains in the vertical position. Parison 14 is extruded over member 18 as illustrated in FIG. 3. When apparatus 10' is moved to the closed position as illustrated in FIG. 4, mold 36' contacts parison 14 and urges it against attaching surface 24. Projections 38, 40 align with grooves 26, 28. The remainder of the invention functions as previously described.

Invention has been illustrated and described as a method of attaching a member to the interior surface of a blow-molded fuel tank. Other embodiments of the present invention are possible without departing from the spirit and scope of the subsequent claims.

What is claimed:

1. A method of securing a member having a dove-tail cross-section recessed attaching surface to the interior of a blow-molded article comprising:

extruding a pliable tubular parison having interior and exterior surfaces between two mold walls, at least one said wall having projections extending toward said exterior parison surface;

attaching said member to a movable blow-pin, said blow-pin positioning said member within said parison;

moving said blow-pin toward said interior parison surface and contacting said exterior parison surface with said projections, said projections mating with said recessed attaching surface, whereby said interior parison surface is urged against said recessed attaching surface by said projections and said member is mechanically secured to said attaching surface by means of an interlocking dove-tail fit; and inflating said parison to form said blow-molded article.

* * * * *